(12) United States Patent
Beckett, II et al.

(10) Patent No.: US 8,861,707 B2
(45) Date of Patent: *Oct. 14, 2014

(54) METHOD AND APPARATUS FOR SIMULTANEOUSLY MONITORING COMPUTER USER SCREEN AND TELEPHONE ACTIVITY FROM A REMOTE LOCATION

(75) Inventors: Stephen Marshall Beckett, II, Canton, GA (US); Donald Andrew House, Niceville, FL (US); Rebecca L. Beckett, Canton, GA (US); Santino J. Lamberti, Jr., Cumming, GA (US)

(73) Assignee: Verint Americas Inc., Alpharetta, GA (US)

( * ) Notice: Subject to any disclaimer, the term of this patent is extended or adjusted under 35 U.S.C. 154(b) by 2626 days.

This patent is subject to a terminal disclaimer.

(21) Appl. No.: 11/166,630

(22) Filed: Jun. 24, 2005
(Under 37 CFR 1.47)

(65) Prior Publication Data
US 2006/0126817 A1 Jun. 15, 2006

Related U.S. Application Data

(63) Continuation-in-part of application No. 10/118,848, filed on Apr. 8, 2002, now abandoned, which is a
(Continued)

(51) Int. Cl.
*H04M 1/64* (2006.01)
*H04M 3/51* (2006.01)
(52) U.S. Cl.
CPC .................................. *H04M 3/5175* (2013.01)
USPC ................ 379/265.06; 379/32.01; 379/88.11; 379/100.05; 379/133; 379/265.07
(58) Field of Classification Search
USPC ........... 379/265.01–266.1, 309, 88.22–88.26, 379/268.06, 32.01, 88.11, 100.05, 133; 709/224; 705/11
See application file for complete search history.

(56) References Cited

U.S. PATENT DOCUMENTS 3,594,919 A 7/1971 DeBell et al.
3,705,271 A 12/1972 DeBell et al.
(Continued)

FOREIGN PATENT DOCUMENTS

EP 0453128 5/1891
EP 0 453 128 A2 10/1991

OTHER PUBLICATIONS

Badre, Albert N., Scott E. Hudson and Paulo J. Santos, "An Environment to Support User Interface Evaluation Using Synchronized Video and Event Trace Recording," Graphics, Visualization, and Usability, Center college of Computing, Georgia Institute of Technology, pp. 1-9, 1993.

(Continued)

*Primary Examiner* — Md S Elahee
(74) *Attorney, Agent, or Firm* — Meunier Carlin & Curfman

(57) ABSTRACT

Systems and methods for monitoring computer user screen an telephone activity from a remote location are provided. The method includes the steps of recording data corresponding to two actual sequential screen changes at the monitored workstation and storing the screen change-related data; recording data corresponding to audio telephone conversation occurring at the monitored workstation during the sequential screen changes and storing the audio telephone conversion-related data; subsequent to steps "a" and "b", playing back, with the use of the screen change-related data and the audio telephone conversation-related data, the audio telephone conversation with the sequential screen changes as they both happened in real time at the monitored workstation, to allow a monitoring workstation to view and hear on-screen and telephone activities as they occurred at the monitored workstation; and, providing training to an agent at the monitored workstation based upon the played back audio and sequential screen changes.

11 Claims, 9 Drawing Sheets

Related U.S. Application Data continuation-in-part of application No. 10/058,911, filed on Jan. 28, 2002, now abandoned, and a continuation-in-part of application No. 09/041,460, filed on Mar. 12, 1998, now Pat. No. 6,510,220, which is a continuation of application No. 08/657,765, filed on May 31, 1996, now Pat. No. 5,790,798, said application No. 10/058,911 is a continuation-in-part of application No. 09/212,900, filed on Dec. 16, 1998, now Pat. No. 6,370,574.

(60) Provisional application No. 60/069,703, filed on Dec. 16, 1997, provisional application No. 60/109,123, filed on Nov. 19, 1998.

(56) References Cited

U.S. PATENT DOCUMENTS

| | | | |
|---|---|---|---|
| 4,510,351 | A | 4/1985 | Costello et al. |
| 4,684,349 | A | 8/1987 | Ferguson et al. |
| 4,694,483 | A | 9/1987 | Cheung |
| 4,763,353 | A | 8/1988 | Canale et al. |
| 4,815,120 | A | 3/1989 | Kosich |
| 4,924,488 | A | 5/1990 | Kosich |
| 4,953,159 | A | 8/1990 | Hayden et al. |
| 5,117,225 | A | 5/1992 | Wang |
| 5,210,789 | A | 5/1993 | Jeffus et al. |
| 5,239,460 | A * | 8/1993 | LaRoche ............... 705/11 |
| 5,241,625 | A | 8/1993 | Epard et al. |
| 5,267,865 | A | 12/1993 | Lee et al. |
| 5,299,260 | A | 3/1994 | Shaio |
| 5,311,422 | A | 5/1994 | Loftin et al. |
| 5,315,711 | A | 5/1994 | Barone et al. |
| 5,317,628 | A | 5/1994 | Misholi et al. |
| 5,347,306 | A | 9/1994 | Nitta |
| 5,388,252 | A | 2/1995 | Dreste et al. |
| 5,396,371 | A | 3/1995 | Henits et al. |
| 5,432,715 | A | 7/1995 | Shigematsu et al. |
| 5,465,286 | A | 11/1995 | Clare et al. |
| 5,475,625 | A | 12/1995 | Glaschick |
| 5,485,569 | A | 1/1996 | Goldman et al. |
| 5,491,780 | A | 2/1996 | Fyles et al. |
| 5,499,291 | A | 3/1996 | Kepley |
| 5,535,256 | A * | 7/1996 | Maloney et al. ............... 379/309 |
| 5,572,652 | A | 11/1996 | Robusto et al. |
| 5,577,112 | A | 11/1996 | Cambray et al. |
| 5,597,312 | A | 1/1997 | Bloom et al. |
| 5,619,183 | A | 4/1997 | Ziegra et al. |
| 5,721,842 | A | 2/1998 | Beasley et al. |
| 5,742,670 | A | 4/1998 | Bennett |
| 5,748,499 | A | 5/1998 | Trueblood |
| 5,784,452 | A | 7/1998 | Carney |
| 5,809,250 | A | 9/1998 | Kisor |
| 5,825,869 | A | 10/1998 | Brooks et al. |
| 5,864,772 | A | 1/1999 | Alvarado et al. |
| 5,884,032 | A | 3/1999 | Bateman et al. |
| 5,978,648 | A | 11/1999 | George et al. |
| 5,990,852 | A | 11/1999 | Szamrej |
| 5,991,373 | A | 11/1999 | Pattison et al. |
| 6,005,932 | A | 12/1999 | Bloom |
| 6,014,134 | A | 1/2000 | Bell et al. |
| 6,038,544 | A | 3/2000 | Machin et al. |
| 6,039,575 | A | 3/2000 | L'Allier et al. |
| 6,058,163 | A | 5/2000 | Pattison et al. |
| 6,078,894 | A | 6/2000 | Clawson et al. |
| 6,091,712 | A | 7/2000 | Pope et al. |
| 6,130,668 | A | 10/2000 | Stein |
| 6,146,148 | A | 11/2000 | Stuppy |
| 6,157,808 | A | 12/2000 | Hollingsworth |
| 6,171,109 | B1 | 1/2001 | Ohsuga |
| 6,201,948 | B1 | 3/2001 | Cook et al. |
| 6,211,451 | B1 | 4/2001 | Tohgi et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,301,462 | B1 | 10/2001 | Freeman et al. |
| 6,301,573 | B1 | 10/2001 | McIllwaine et al. |
| 6,324,282 | B1 | 11/2001 | McIllwaine et al. |
| 6,459,787 | B2 | 10/2002 | McIllwaine et al. |

OTHER PUBLICATIONS

"Keeping an Eye on Your Agents", Call Center Magazine, p. 32-34, Feb. 1993 ("the Call Center Magazine article").

Manohar, Nelson R. and Atul Prakash, "Dealing with Synchronization and Timing Variability in the Playback of Interactive Session Recordings," Proceedings, ACM Multimedia '95, San Francisco, California, Nov. 5-9, 1995, ACM Press, pp. 45-56, 1995.

Manohar, Nelson R. and Atul Prakash, "Replay by Re-execution: a paradigm for asynchronous collaboration via record and replay of interactive multimedia sessions", Department of Electrical Engineering and computer Science, University of Michigan at Ann Arbor, Ann Arbor, MI, pp. 1-6, Aug. 1994.

Mathur, Amit G. and Atul Prakash, "Protocols for Integrated Audio and Shared Windows in Collaborative Systems", Department of Electrical Engineering and Computer Science, University of Michigan at Ann Arbor, Ann Arbor, MI, pp. 381-388, Aug. 1994.

Moore, D.J., Multimedia presentation development using the Audio Visual Connection:, IBM Systems Journal, vol. 29, No. 4, pp. 494-508, 1990.

Product description titled "Metheus-X Window Recording and Playback, XRP Features and Benefits", Sep. 1994, 2 pages.

"Quality Must be Seen and Heard", Inbound/Outbound Magazine, p. 66-67, Dec. 1989.

Aspect Call Center Product Specification, "Release 2.0", Aspect Telecommunications Corporation, May 23, 1998.

"Customer Spotlight: Navistar International," Web page, unverified print date of Apr. 1, 2002.

"DKSystems Integrates QM Perception with OnTrack for Training," Web page, unverified print date of Apr. 1, 2002, unverified cover date of Jun. 15, 1999.

"Keeping an Eye on Your Agents", Call Center Magazine, pp. 32-34, Feb. 1993.

"'OnTrack Online' Delivers New Web Functionality," Web page, unverified print date of Apr. 2, 2002, unverified cover date of Oct. 5, 1999.

"PriceWaterhouseCoopers Case Study: The Business Challenge," Web page, unverified cover date of 2000.

Abstract, net.working: "An Online Webliography," *Technical Training* pp. 4-5 (Nov./Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of AI in Education," *AMC Crossroads* vol. 1:1-13 (Fall 1996), Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," *Communications ACM* 45(5):62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosky et al., "Distributed intelligent tutoring on the Web," Proceedings of the 8th World Conference of the AIED Society, Kobe, Japan, Aug. 18-22, pp. 1-9, Web page, unverified print date of Apr. 12, 2002, unverified cover date of Aug. 18-22, 1997.

Brusilovsky and Pesin, "ISIS-Tutor: An Intelligent Learning Environment for CDS/ISIS Users," pp. 1-15 Web page, unverified print date of May 2, 2002.

Brusilovsky, "Adaptive Educational Systems on the World-Wide-Web: A Review of Available Technologies," pp. 1-10, Web page, unverified print date of Apr. 12, 2002.

(56) References Cited

OTHER PUBLICATIONS

Byrnes et al., "The Development of a Multiple-Choice and True-False Testing Environment on the Web," pp. 1-8, Web page, unverified print date Apr. 12, 2002, unverified cover date of 1995.
Calvi and De Bra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Apr. 12, 2002, unverified cover date of 2001.
Cole-Gomolski, "New ways to manage E-Classes," *Computerworld* 32(48):4344 (Nov. 30, 1998).
Cross, "Sun Microsystems—the SunTAN Story," Internet Time Group 8 (© 2001).
Cybulski and Linden, "Teaching Systems Analysis and Design Using Multimedia and Patterns", unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2)57-64 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
*e-Learning the future of learning*, THINQ Limited, London, Version 1.0 (2000).
Eklund and Brusilovsky, "The Value of Adaptivity in Hypermedia Learning Environments: A Short Review of Empirical Evidence," pp. 1-8, Web page, unverified print date of May 2, 2002.
Eline, "Case Study. Bridging the Gap in Canada's IT Skills," *Technical Skills and Training* pp. 23-25 (Jul. 1997).
Eline, "A Trainer's Guide to Skill Building," *Technical Training* pp. 34-41 (Sep./Oct. 1998).
Eline, "Case Study: IBTs Place in the Sun," *Technical Training* pp. 12-17 (Aug./Sep. 1997).
Fritz, "ToolBook II: Asymetrix's updated authoring software tackles the Web," *Emedia Professional* 10(2):102106 (Feb. 1997).
Fritz, "CB templates for productivity: Authoring system templates for trainers," *Emedia Professional* 10(8):6876 (Aug. 1997).
Gibson et al., "A Comparative Analysis of Web-Based Testing and Evaluation Systems," pp. 1-8, Web page, unverified print data of Apr. 11, 2002.
Hallberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Writing Performance Objectives Simple as A-B-C (and D)," *Technical Skills and Training* pp. 5-7 (May/Jun. 1996).
Heideman, "Training Technicians for a High-Tech Future: These six steps can help develop technician training for high-tech work," pp. 11-14 (Feb./Mar. 1995).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3):5053 (Mar. 1998).

Larson, "Enhancing Performance Through Customized Online Learning Support," *Technical Skills and Training* pp. 25-27 (May/Jun. 1997).
Linton et al., "OWL: A Recommender System for Organization-Wide Learning," *Educational Technical Society* 3(1):62-76 (2000).
Lucadamo and Cheney, "Best Practices in Technical Training," *Technical Training* pp. 21-26 (Oct. 1997).
McNamara, "Quality Must Be Seen and Heard", Inbound/Outbound Magazine, pp. 66-67, Dec. 1989.
Merrill, "The New Component Design Theory: Instruction design for courseware authoring," *Instructional Science* 16:19-34 (1987).
Metheus X Window Record and Playback, XRP Features and Benefits, 2 pages, Sep. 1994.
Minton-Eversole, "IBT Training Truths Behind the Hype," *Technical Skills and Training* pp. 15-19 (Jan. 1997).
Mizoguchi, "Intelligent Tutoring Systems: The Current State of the Art," *Trans. IEICE* E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, *Database Marketing*, McGraw-Hill, Inc., USA, pp. 158-165, 172-185 (1993).
Nelson et al., "The Assessment of End-User Training Needs," *Communications ACM* 38(7):27-39 (Jul. 1995).
O'Herron, "'CenterForce Technologies' CenterForce Analyzer," Web page, unverified print date of Mar. 20, 2002, unverified cover date of Jun. 1, 1999.
O'Roark, "Basic Skills Get a Boost," *Technical Training* pp. 10-13 (Jul./Aug. 1998).
Pamphlet, "On Evaluating Educational Innovations," authored by Alan Lesgold, unverified cover date of Mar. 5, 1998.
Papa et al., "A Differential Diagnostic Skills Assessment and Tutorial Tool," *Computer Education* 18(1-3):45-50 (1992).
Phaup, "New Software Puts Computerized Tests on the Internet: Presence Corporation announces breakthrough Question Mark™ Web product," Web page, unverified print date of Apr. 1, 2002.
Phaup, "Question Mark Offers Instant Online Feedback for Web Quizzes and Questionnaires: University of California assist with Beta Testing, Server scripts now available to high-volume users," Web page, unverified print date of Apr. 101, 2002, unverified cover date of May 6, 1996.
Phaup, "QM Perception™ Links with Integrity Training's WBT Manager™ to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Piskurich, "Now-You-See-'Em, Now-You-Don't Learning Centers," *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," *Journal of Instructional Development* 7(3):17-22 (1984).
The Editors, Call Center. "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Untitled. 10th Mediterranean Electrotechnical Conference vol. 1 pp. 124-126 (2000).
Unknown Author. "Long-distance learning," *InfoWorld* 20(36):7276 (1998).

(56) References Cited

OTHER PUBLICATIONS

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "*Building Customer Loyalty Through Business-Driven Recording of Multimedia Interactions in your Contact Center*" (2000).

PCT International Search Report, International Application No. PCT/US03/02541, mailed May 12, 2003.

\* cited by examiner

METHOD AND APPARATUS FOR SIMULTANEOUSLY MONITORING COMPUTER USER SCREEN AND TELEPHONE ACTIVITY FROM A REMOTE LOCATION

CROSS-REFERENCE TO RELATED APPLICATIONS

This application is a continuation-in-part application of and claims the full benefit of priority and incorporates by reference pending application Ser. No. 10/118,848, filed Apr. 8, 2002, which is a continuation-in-part application of and claims the full benefit of priority and incorporates by reference pending application Ser. No. 10/058,911 filed Jan. 28, 2002; and is also a continuation-in-part of application Ser. No. 09/041,460, filed Mar. 12, 1998, now U.S. Pat. No. 6,510,220, which is a continuation application of application Ser. No. 08/657,765, filed May 31, 1996, now U.S. Pat. No. 5,790,798; and is also a continuation-in-part application of and claims the full benefit of priority and incorporates by reference application Ser. No. 09/212,900 filed Dec. 16, 1998, now U.S. Pat. No. 6,370,574, which claimed priority to U.S. Provisional Applications No. 60/069,703 filed Dec. 16, 1997 and No. 60/109,123 filed Nov. 19, 1998, which Provisional Applications are hereby incorporated by reference herein.

TECHNICAL FIELD

This disclosure relates in general to computer-telephony integration, and more particularly relates to voice and data recording and monitoring of a computer workstation. Such recording and monitoring is useful for providing evaluation to those using such workstations, especially in connection with telephone use, can also be useful for providing an audit trial of significant on-screen events, or can be used as a trigger to initiate other separate events.

BACKGROUND OF THE DISCLOSURE

In some business environments, computers are used in conjunction with telephones in order to provide services. For example, in providing credit card-related services, it is known to provide customer service representatives (hereinafter referred to as "agents" or "employees"), with access to a computer workstation as well as a telephone. In the process of providing telephonic service from the agent to the customer, typically a customer will contact the agent (or vice versa) through a telephone connection, and the customer and the agent will discuss matters relating to the customer's account over the telephone.

During such telephone calls, in order to provide supportive information regarding the customer's account, it is likewise conventional to provide the customer's account information at the agent's workstation. As an example, in the instance of credit card services, it is conventional to provide the agent's computer with information such as the customer's outstanding balance, the amount last paid, etc. It is also known to provide the agent with access to a database including certain fields, to which the agent can input data responsive to the telephone conversation. For example, the agent may wish to insert data to indicate that the customer has promised payment by a certain date, or that certain special attention should be given to the customer for any reason.

It is likewise conventional to provide such agents in groups, conventionally referenced as "call centers". In certain instances, such call centers may have as many as 200 "agents" in a group, each having their own telephone extension, and each likewise having their own computer workstation having a monitor (or "screen"), which provides video signals responsive to various commands.

In order to provide supervision of such agents, it is often desired to allow an agent's supervisor (hereinafter "supervisor"), with a means for monitoring the screen and voice activities of such agents during their telephone conversations. Such monitoring of a "monitored workstation" may be considered quality control of the agent's services. For example, it is worthwhile for a supervisor to know if an agent is using his/her computer time efficiently (not moving back and forth from various screens or applications unnecessarily), or is rude or discourteous while on the telephone. Such information can be determined by having a supervisor "look over the shoulder" of an agent, viewing his/her computer activities as well as listening to the telephone conversations; however, due to human nature this tends to be an ineffective practice as an agent will tend to be "on guard" while being monitored, which may not provide the supervisor with a good example of how the agent normally would conduct his/her duties when not being monitored. For example, the agent could become nervous and not perform as well as normal if he/she knows he/she is being monitored.

Therefore, a need has been determined to provide remote monitoring of an agent's workstation, without the agent knowing it; in such an environment a supervisor can determine the agent's more typical activities on the job, therefore being provided with a more accurate set of information. Such a need is also present when multiple agents are being monitored.

Needs have also been determined to provide remote monitoring of an agent's workstation for purposes other than evaluation, such as to provide a record of on-screen events for audit trail purposes (such as could be the case in monetary wire transfers), or to provide a trigger to initiate other events such as critical account monitoring, all which may be done in a manner "transparent" to the agent.

SUMMARY OF THE DISCLOSURE

The present disclosure overcomes deficiencies in the prior art by providing an improved method and apparatus for providing on-the-job work training of an agent or employee, including the provision for passive workstation monitoring which does not interfere with the operation of the employee's workstation, yet allows a supervisor of the employee to simultaneously monitor (and/or record for later playback if (desired) the on-screen and telephonic activities of the employee, in order to provide the employee with valuable and accurate feedback regarding that employee's work habits, or to provide an audit trail or other function. Generally described, a method and apparatus for training an agent associated with a monitored workstation having a display screen and a telephone extension are provided. Data corresponding to two actual sequential screen changes occurring at said monitored workstation is recorded, and the screen change-related data is stored. Data corresponding to audio telephone conversation occurring at the monitored workstation during the two actual sequential screen changes is recorded, and the audio telephone conversation-related data is stored. Subsequent to the recording of the screen changes and the audio telephone conversation, the audio telephone conversation is played back, with the use of the screen change-related data and the audio telephone conversation-related data, in substantial synchronization with the sequential screen changes as they both happened in real time at the monitored workstation, to allow one at a monitoring workstation to simultaneously view and hear on-screen and telephone activities substantially as they occurred at said monitored workstation. Training is provided to an agent associated with the monitored workstation based upon the played back audio telephone conversation and sequential screen changes. In addition to, or as an alternative to the training, feedback may be provided to an agent associated with the monitored workstation based upon the played back audio telephone conversation and sequential screen changes.

Therefore, it is an object of the present disclosure to provide a method and apparatus for providing improved on-the-job employee training. Therefore, it is an object of the present disclosure to provide a method and apparatus for providing an audit trail of on-screen activities.

It is a further object of the present disclosure to provide a method and apparatus for providing improved employee training which is not disruptive to the employee's work activities.

It is a further object of the present disclosure to provide a method and apparatus for simultaneously monitoring the on-screen and telephone activities of an employee's workstation.

It is a further object of the present disclosure to provide a method and apparatus for simultaneously monitoring the on-screen and telephone activities of an employee's workstation, without the employee knowing same.

It is a further object of the present disclosure to provide a method and apparatus for simultaneously monitoring the on-screen and telephone activities of an employee's workstation, to determine the efficiency of the employee's activities.

It is a further object of the present disclosure to provide passive monitoring of an employee's workstation.

It is a further object of the present disclosure to provide a method and apparatus for simultaneously recording the on-screen and telephone activities of an employee's workstation, to allow for the remote playback of said activities at a second workstation at a later time for review purposes.

It is a further object of the present disclosure to provide a method and apparatus for simultaneously recording the on-screen and telephone activities of an employee's workstation, to allow for the remote playback of said activities at a second workstation on a common network.

It is a further object of the present disclosure to provide a method and apparatus for distributing information representing customer interactions throughout an enterprise. It is a further object of the present disclosure for targeting training to agents, based on this information, to improve the transactions between agents and other parties.

Other objects, features, and advantages of the present disclosure will become apparent upon reading the following detailed description of the preferred embodiment of the disclosure when taken in conjunction with the drawing and the appended claims.

DETAILED DESCRIPTION OF THE PREFERRED EMBODIMENT

Reference is now made to the drawings, in which like numerals indicate like elements throughout the several views.

General Configuration

Figure 1:
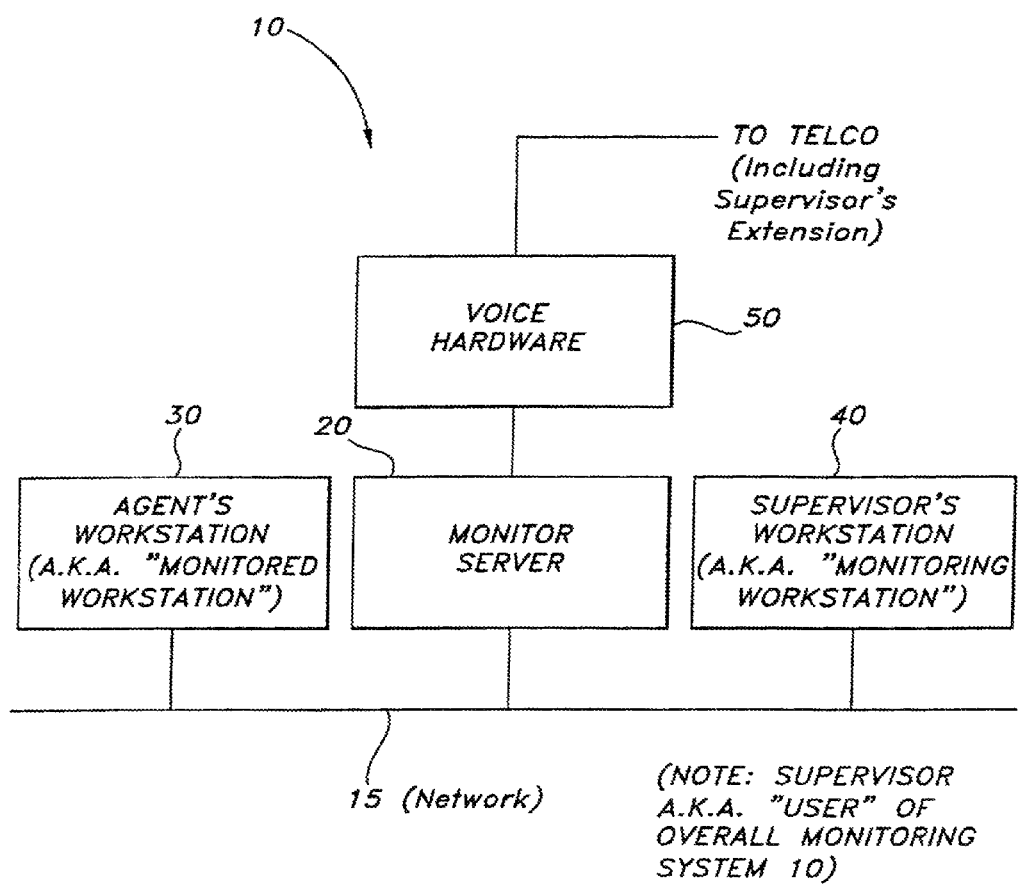
FIG. 1 is a diagram illustrating data flow paths intermediate various main elements used to practice the present disclosure.

Reference is now made to FIG. 1, which generally illustrates an overall configuration 10 according to the present disclosure. As shown, the configuration 10 includes a network interconnection means 15, to which is attached a server 20, a monitored workstation 30 (a.k.a. an "agents workstation"), and a monitoring workstation 40 (a.k.a. a "supervisor's workstation"). In the preferred embodiment, networking between these elements is done through TCP/IP protocols, although often other network protocols may be used without departing from the spirit and scope of the present disclosure. Voice hardware/Software 50 is within or linked to the server 20 and controlled by server software as discussed later.

Under at least one embodiment of the present disclosure, on-screen activities conducted at the monitored workstation 30 can be viewed (or "monitored") by the supervisor (a.k.a. "user") on the screen of the monitoring workstation 40 either in real time (i.e., as the activities are actually occurring), and/or the on-screen activities conducted at the monitored workstation 30 can be recorded on the server 20 and "played back" at the monitoring workstation 40 at a later time. Under this embodiment of the present disclosure these activities may be played back much as one would play back the video tape of a television program, that is the on-screen and synchronized voice activities (routed through use of conventional voice hardware or software via the network) that occurred at the monitored workstation 30 may allowed to "play" at the monitoring workstation 40 substantially as they actually happened, portions may be replayed, the activities may be stopped or "paused" for particular review, and certain portions may be skipped if so desired.

General Operation

Under a first embodiment of the present disclosure, software on the server is configured to send data polls to software installed and running on the agent's workstation. The software on the agent's workstation intercepts or "hooks" operating system graphics primitives relevant to actual screen display, and returns only selected screen portions (referred to as "Changed Regions") which have changed since the last data poll. These Changed Regions are then displayable at a remote location either in real time or at a later time. The technique is substantially "passive" in that it preferably does not perceptibly interfere with the operation of the agent's workstation which would be a signal to the agent that he or she is being monitored.

Under a second embodiment of the present disclosure, in response to a poll, the full screen is grabbed and compared (such as by an XOR operation) to a previously grabbed screen, and Changed Regions including the screen differences are sent over the network to the server. In one implementation, the first and last "differences" in the XOR comparison are determined, and all data therebetween is considered within the Changed Region, which is not in this case necessarily rectangular.

The Monitored Workstation

General Environment

As noted above, one typical operating environment intended for the present disclosure is one known as a "call center" for credit services, in which an agent is taking and/or making calls to credit card customers, which may have questions regarding the status of their account(s). In such an environment, it would not be uncommon for a calling agent, during the course of a single telephone call, to access multiple screens and/or application windows in order to provide customer service. In order to provide consistent and acceptable service to such customers, it has been found advantageous to simultaneously monitor the "desktop" screen display and the telephonic habits of the agents, in order to properly train agents and to provide quality control of the agent's services.

A typical Monitored Workstation 30 includes hardware and software mounted thereon. An independent telephone extension is likewise typically provided alongside the Workstation 30, so one can talk on the phone while viewing the Workstation 30.

Hardware

The hardware used is typically conventional PC hardware such as that used to operate OS/2, Linux, Unix and its variants or Windows, and different hardware configurations may be used without departing from the spirit and scope of the present disclosure.

Software

Figure 2:
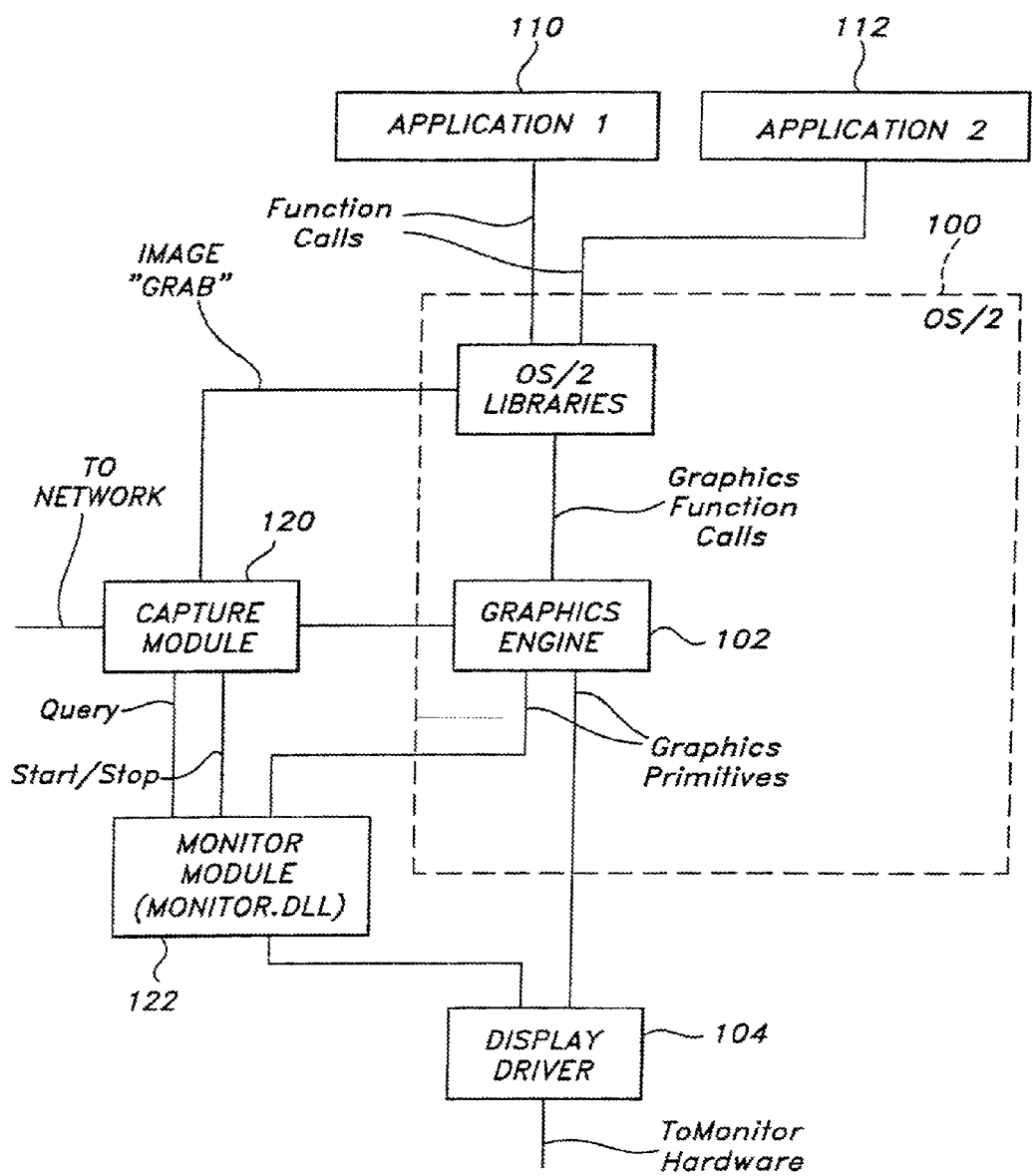
FIG. 2 is a diagram illustrating data flow within software located on the agent's workstation.

Referring now also to FIG. 2, under one embodiment of the present disclosure, the Monitored Workstation 30 is loaded with and runs a conventional graphics user interface such as OS/2 (indicated generally as 100 and defined by the dotted line). As is known in the art, the OS/2 operating system 100 incorporates the use of a graphics engine 102 (known as OS2GRE in OS/2 and GDI in Windows). Upon receiving an instruction from, for example, one of applications 110 and 112, (example: "draw a window") the operating system will utilize its Graphics Engine 102 to send a combination of typically smaller, more specific (i.e., low level) instructions by means of graphics primitives (e.g. "draw line", "bitblt" "draw wide border", "draw text", etc.,) to whatever video driver 104 (also known as a display driver) associated with the particular video display hardware (not shown) is being used within the monitored workstation. As noted in more detail below, it is these graphics primitives (function calls in their own right) which are interpreted under the present disclosure in order to define localized screen changes. Such screen changes can be due to "on screen typing", as described in detail below, or can also be pursuant to manual or automatic user commands (open/close window), or can be other automatic screen changes such as caused by a blinking cursor or an on-screen clock.

As may be understood, multiple applications 110, 112 may be used by the agent on the Monitored Workstation 30 in providing service to the customers. Since every application is drawing to its own virtual desk top, and because it does not know what the other applications are doing, it is the graphic engine's job to take different requests from the applications, to determine what requests should be visible to the end user, and send those requests as a list of primitives to the video driver.

The general configuration and operation of the operating system 100 such as OS/2 is assumed to be known to one skilled in the art; however, the reference manual "OS/2 2.0 Technical Library—Presentation Driver Reference, Version 2.00", Published by IBM, First Edition, copyright 1992, and subsequent versions thereof, are incorporated herein by reference, including but not limited to the general operation of the OS/2 operating system, the function and operation of graphics primitives generally and individually, and dynamic link library functions (DLLs).

The Agent's Software Setup

Generally

The capturing software generally consists of two modules, a Capture Module 120 and a Monitor Module 122. The Capture Module 120 is queried from the network as described in further detail below, and it in turn queries the Monitor Module 122. Prior to such query, the Monitor Module 122 has been monitoring some of the graphics primitives sent from the Graphics Engine 102 to the Display Driver 104, to determine if visible screen changes have been made, and if so where the changes have been made. Once given the boundaries (but not the content) of such a region (hereinafter the "Changed Region"), it is then the Capture Module's duty to go to the operating system, use some of its function calls to grab a copy of the Changed Region, compress it, and send it out onto the network and eventually to the server.

All of the above activities can be and are preferably accomplished without any input from the Agent, and typically the Agent will have no knowledge that any of the above activities have occurred. This "transparent" operating feature allows for a realistic, typical sample of the Agent's on-screen activities.

The Changed Region and the Accumulated Changed Rectangle

Figure 3A:
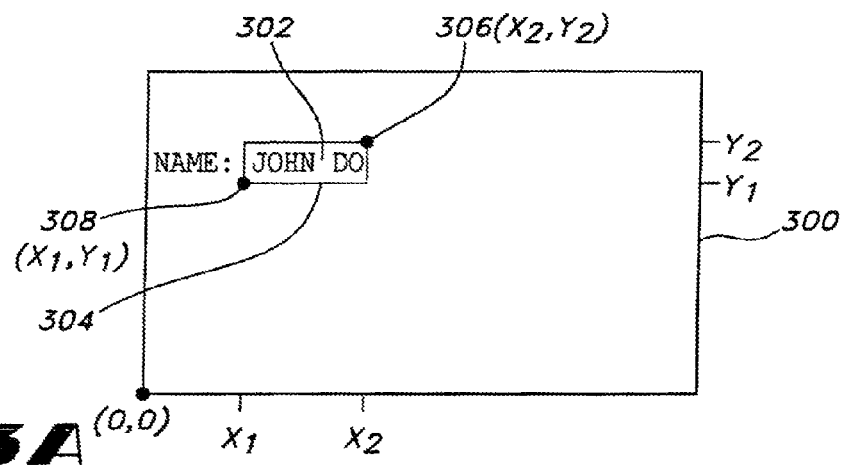
FIGS. 3a-3c are sequential illustrative views showing sequential screen updates of "Changed Regions" 302 developed under the present disclosure by "Accumulated Changed Rectangles" likewise developed under the present disclosure.
Figure 3B:
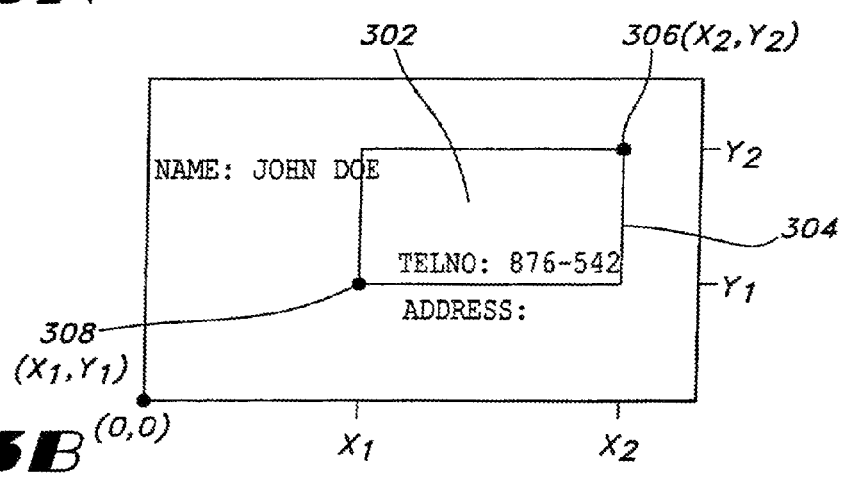
Figure 3C:
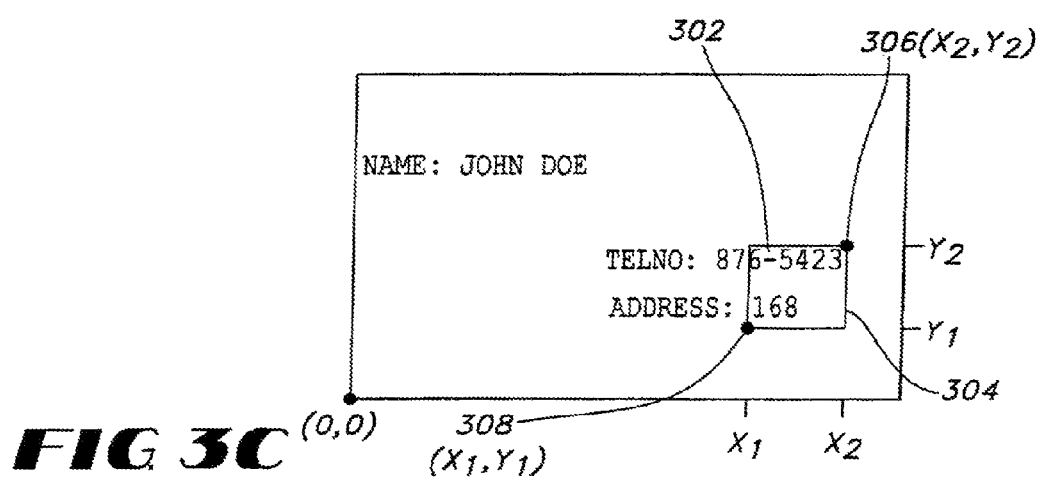

Referring now to FIGS. 3a-3c, at this point it is worthwhile to discuss some details of the Changed Region 302 and the Accumulated Changed Rectangle 304. FIG. 3a illustrates a typical agent's visible screen 300 (a.k.a. "desktop"). Provision is made to allow the agent to type in a customer's name (example: "JOHN DOE") telephone number (example: 876-5423) and address (example: 168 Maple Street) into corresponding field of a typical database.

Changes to the agent's desktop can be considered "updates" to previous screen images. Under the present disclosure, these updates are periodically grouped together as "Changed Regions", and information relating to these Changed Regions is sent back to the server to allow for its viewing at a remote location (for example at the Monitoring Workstation), typically by "pasting" the Changed Region atop a previous screen image corresponding to the agent's desktop prior to the update in the Changed Region. One embodiment of the present disclosure defines the boundaries of such a changed region by use of an Accumulated Changed Rectangle", which is updated by the use of graphics primitives as discussed in later detail.

Reference is now made to FIG. 3a. By typing the letters "JOHN DO". it may be seen that the agent has updated a portion of the screen which can be circumscribed by an Accumulated Changed Rectangle 304, which is the Changed Region 302. In this case, the first and last typed letters between data polls are "J" and "O". Under the example given, after the "O" is typed, a data poll from the server will cause the Capture Module 120 to request the boundaries of the Accumulated Changed Rectangle 304 from the Monitor Module 122. The Monitor Module returns such information by returning the screen coordinates of two separate points 306 and 308 in the form $(x_1, y_1, x_2, y_2)$. It may be seen that such coordinates define the upper and lower x and y screen pixel ranges occupied by the Changed Region 302.

FIG. 3b illustrates a subsequent Changed Region 302 defined by an Accumulated Changed Rectangle 304. It may be seen that the first typed character in this subsequent Changed Region 302 is "E", and the last typed character is "2".

FIG. 3c shows yet another subsequent Changed Region 302, its first typed character being "3", and the last typed character being "8". The definition and separation of the Accumulated Changed Rectangles 304 will be clarified by later discussion.

As noted above, it is important to note that on-screen changes due to typing as described above are not the only type of screen changes which can be monitored under the present disclosure. Other such screen changes could be those also be pursuant to manual or automatic user commands such as "open/close window"-type commands, "draw bitblt"-types of commands, or can be other automatic screen changes such as those caused by a blinking cursor or an on-screen clock. For example, a database application's window could be opened (or brought to the top of the desktop) by a user pursuant to a command, which would result in at least the displayed window (and its contents) being included in a Changed Region. After the window was opened, as an example a customer's account number could be entered into a field (creating screen changes) which could result in the database application automatically displaying supplemental on-screen information such as the customer's address, telephone number, and account history. All such "automatic" screen changes would likewise be included in the Changed Region.

The Capture Module 120

As generally noted above, it is the function of the Capture Module 120 to capture the Changed Region 302 defined by the Accumulated Changed Rectangle 304 provided by the Monitor Module 122, and send data corresponding to the region 302 over the network 15 to the server 20.

The Capture Module 120 listens on an IP port of a TCP/IP network, although other network protocols are contemplated under the present disclosure. All TCP/IP communications and protocols are handled by the Capture Module 120.

In one embodiment, the Capture Module 120 receives instructions from the server (over the network) to either "Get First", or "Get Next". "Get First" instructs the Capture Module to grab the entire desktop and begins sending it to the server over the network. "Get Next" instructs the Capture Module to grab a Changed Region (including all changes since the last grab), and begin sending the Changed Region to the server over the network, unless there is some data remaining in the Capture Module from a previous capture. In the case of the latter, the remaining data (or a portion thereof) is transferred as detailed below.

In an alternate configuration, it may also be possible to provide the Capture Module with three basic instructions from the server over the network, to begin monitoring, end monitoring, or to respond to a data poll requesting Changed Region data.

If the server instructs the Capture Module 120 to "Get First", the Capture Module sends an instruction to the Monitor Module 122 to begin (or to resume) monitoring, which typically includes an instruction to reset Changed Region boundaries as described in further detail below. The Monitor Module 122 then resumes a process of intercepting and interpreting graphics primitives (as described elsewhere in more detail) until the Capture Module 120 queries the Monitor Module 122 and is given the above-referenced coordinates of and Accumulated Changed Rectangle which bounds the Changed Region.

Under one embodiment of the present disclosure, every time the Monitor Module 122 is queried by the Capture Module 120, it returns a return code (indicating "screen changes" or "no screen changes") and the above-referenced screen coordinates $(x_1, y_1, x_2, y_2)$. If the return code indicates changes have been made to the coordinates $(x_1, y_1, x_2, y_2)$ since they were last reset, the coordinates $(x_1, y_1, x_2, y_2)$ are used by the Capture Module 120 to capture the Changed Region. As described in detail below, Changed Region data is stripped of some of its color-related data, compressed, and then sent over the network to the server.

In order to store the bitmap of the Changed Region, the Capture Module 120 utilizes its own device context or "workspace". Its maximum size is the desktop. No presentation space allowing for viewing of the Capture Module's device context is needed for operation of the Capture Module, although one could be used for software diagnostic purposes.

After receiving the boundaries of the Changed Region, from the Monitor Module 122, the Capture Module 120 issues a graphics call to grab the bitmap which is defined by the Accumulated Changed Rectangle. When grabbing that bitmap, if the monitored workstation's desktop bitmap is 256 colors, the Capture Module can grab the bitmap into 16 color format, thus effectively "stripping" some data therefrom, thus reducing the amount of data to be sent over the network.

As noted above, the Monitor Module 122 sends the Changed Region screen coordinates $(x_1, y_1, x_2, y_2)$ to the Capture Module 120 upon query from the Capture Module. Upon such a query, the coordinates $(x_1, y_1, x_2, y_2)$ are immediately reset to their reset values (discussed in more detail below). Such resetting upon query is done as an atomic operation in order that screen changes are not missed between query and reset.

As noted above, the Changed Region screen coordinates $(x_1, y_1, x_2, y_2)$ are periodically reset upon query by the Capture Module. These values correspond to the minimum x value, maximum y value, maximum x value, and maximum y value, respectively, for the pixels within the Changed Region. When reset, these values are set such that $x_1$ is set to a value higher than the highest possible x value of any pixel on the desktop, $x_2$ is set to a value lower than the lowest possible x value of any pixel on the desktop, $y_1$ is set to a value higher than the highest possible y value of any pixel on the desktop, and $y_2$ is set to a value lower than the lowest possible y value of any pixel on the desktop. This allows the "update logic" to be consistent from the first time the coordinates need updating.

After the Changed Region is grabbed from the agent's desktop, it is then compressed (if so desired) by the Capture Module 120. Various compression techniques may be used without departing from the spirit and scope of the present disclosure.

The compressed Changed Region data can now be transferred along the network to the server. The poll from the server to the Capture Module 120 includes a maximum defined sample size which may be sent over the network, and may be restricted according to the network's data flow limitations. Therefore it may be understood that the data corresponding to the buffered Changed Region data may exceed the server-defined sample size. If so, the Capture Module 120 sends the Changed Region data along the network in multiple portions corresponding to sample size.

Each portion of at-most-sample-sized data is sent back to the server with flags to indicate if it is the entire Changed Region Data ("Only in Chain") or if it is part of a chain of samples ("First in Chain", "Middle in Chain", "Last in Chain"). The server recognizes the flags and begins to store the data in a journal file (see FIG. 5) as described further below. After each sample is received by the server, it then waits a preset "poll delta" time period until sending another poll across the network to the Monitor Module 122 for the next sample.

As an example, if a particular Captured Region stored and compressed by the Monitor Module is 70K, and the sample size limit was 25K, the Monitor Module would send back three samples sized 25, 25, and 20K, in response to three polls, and upon the fourth server data poll the Capture Module 120 would query the Monitor Module for a new Accumulated Changed Boundary.

Figure 4:
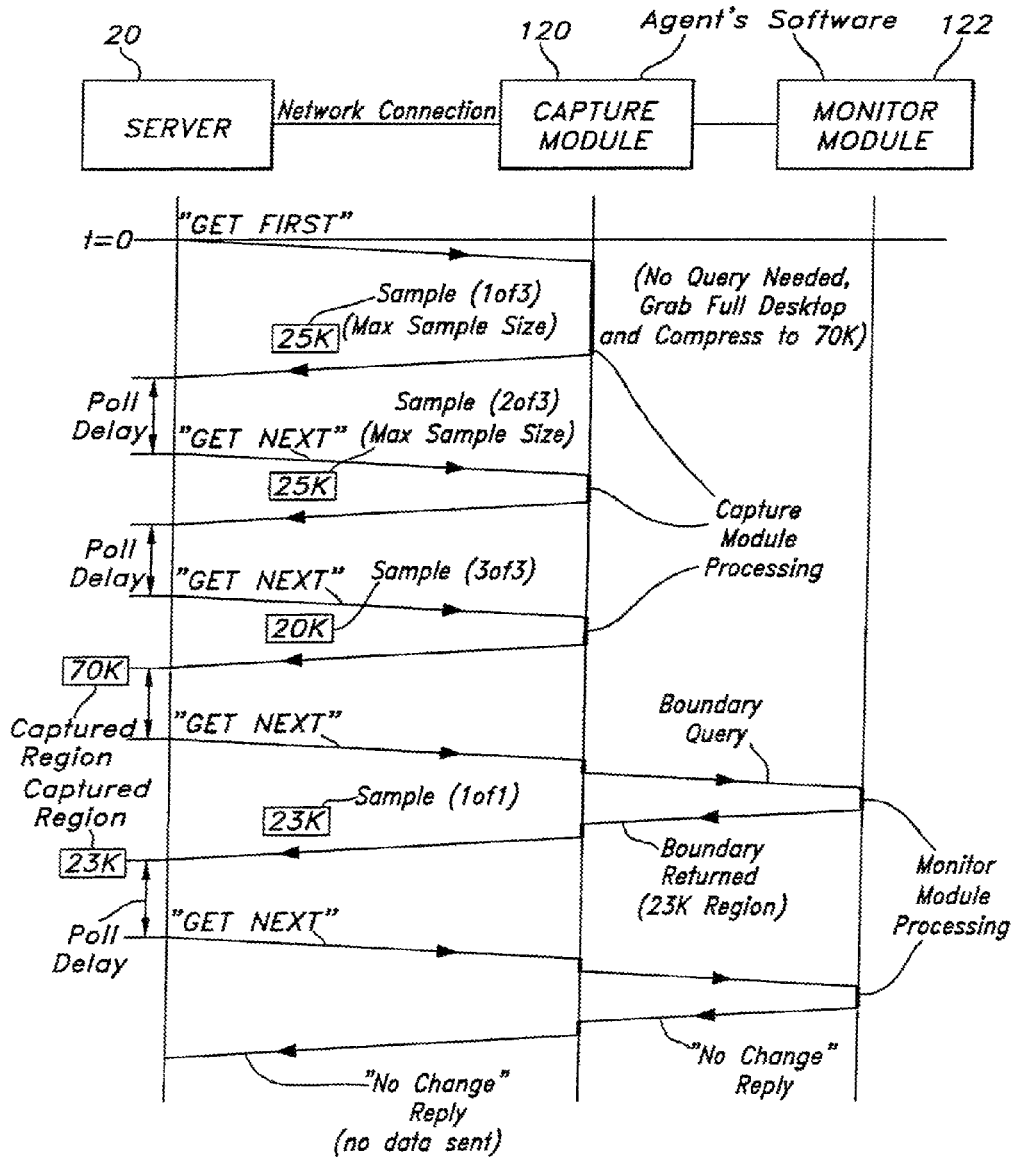
FIG. 4 is an illustrative view illustrating data flow intermediate the Server, the Monitor Module, and the Capture Module.

Reference is now made to FIG. 4, which illustrates instruction and data flow between the server 20, the Capture Module 120, and the Monitor Module 122. In the example shown, a first "Get First" command is given from the Server to the Capture Module (over the network connection). No query is needed from the Capture Module to the Monitor Module; this uses a full desktop grab, which after compression results in, for example, a 70K block of data to be sent from the Capture Module to the Server. As the defined maximum sample size over the network is for this example 25K, the response to the "Get First" command results in the return of a 25K data sample, followed by another 25K sample, followed by a 20K sample. After each sample is returned, a predetermined "poll delay" time period is allowed to pass before the next poll, a "Get Next" poll, is sent from the server. After the 70K (25+25+20) block of data corresponding to the first full desktop grab is received by the server, it is time stamped as detailed below and the server waits another "poll delay" time period until sending another "Get Next" poll. In the FIG. 4 example the Capture Module then does poll the Monitor Module 122 for the above-referenced screen coordinates ($x_1$, $y_1$, $x_2$, $y_2$). After receiving the coordinates, in the example shown, a 23K grab is made, which is within the 25K limit, thus allowing an "only-in-chain" transfer across the network to the Server. After waiting another "poll delay" (also known as a "poll delta") time period, the server sends another "Get Next" poll. In the FIG. 4 example, no screen changes had been made, so no Changed Region data is grabbed from the agent's desktop by the Capture Module.

It may be understood that the time periods between the poll delay periods are variable, depending on network traffic and processing times of the Capture and Monitor Modules. This is consistent with that shown in FIG. 5 indicating that the Changed Region data is received at the server at varying time intervals.

The Monitor Module 122

As noted above, the Monitor Module 122 monitors particular graphics primitives being sent from the graphics engine 102 to the display driver 104. Such "monitoring" is done in one preferred embodiment by "hooking" the primitives through (in the case of OS/2) use of a user provided Dynamic Link Library (DLL) specified in file OS2.INI. This library in one preferred embodiment is the Monitor Module 122 (MONITOR.DLL, see FIG. 2). More detailed discussion of the "hooking" technique is provided below.

As noted above, between queries from the Capture Module 120, the Monitor Module 122 is intercepting and interpreting primitives and defining an Accumulated Changed Rectangle 304 (which defines the Changed Region). Upon query from the Capture Module 120, it will return to the Capture Module the screen coordinates of two separate points 306 and 308 in the form ($x_1$, $y_1$, $x_2$, $y_2$), identifying the Rectangle 304. As noted above, these two points correspond to opposing corners of the rectangular shaped Changed Region. This is all of the information sent to the Capture Module 120 from the Monitor Module 122. Immediately upon such query, the Monitor Module 122 resets the screen coordinates ($x_1$, $y_1$, $x_2$, $y_2$) to their reset values as discussed above, and then again starts accumulating changed regions defined by the primitives.

Hooking; Graphics Primitives and Their Interpretation

As noted above, the Monitor Module 122 intercepts and interprets graphics primitives sent from the Graphics Engine 102 to the Display Driver 104.

As will be appreciated by one skilled in the art, when an application running under an operating system such as OS/2 wishes to perform output, actions common to any output device are handled by the Graphics Engine 102. Actions using knowledge of the specific output device are forwarded to a Presentation Driver.

OS/2, for example, indicates that Presentation Drivers provide a entry point, OS2_PM_DRV_ENABLE, through which an initialization sequence is performed. In one step of that initialization sequence, the Presentation Driver fills in a Dispatch Table. The Dispatch Table, which resides in the Graphics Engine's memory space, then contains pointers to functions residing in the Presentation Driver. The Dispatch Table provides the Graphics Engine with the functions to invoke when a graphic operation is to be performed on a specific piece of hardware. These graphic operations are frequently referred to as graphics primitives.

OS/2 also provides a mechanism for a program to examine, and modify, the contents of the Dispatch Table. In OS/2, by creating an entry in file OS2.INI, as detailed below, a user provided Dynamic Link Library, or DLL, is called soon after the Presentation Driver has initialized the Dispatch Table. The user provided DLL can then modify the dispatch table, and intercept future graphics primitive calls. The entries in the dispatch table are in predefined order. For example, we know that address of the graphics primitive GreBitblt resides in entry 0x26.

The entry into OS2.INI is as follows:
Application Name: PM_ED_HOOKS
Key Name: PMDDHK
Text: [filename of user provided DLL]

The user provided DLL provided under the present disclosure, below referred to as MONITOR.DLL (also known as the above-referenced "Monitor Module 122"), must and does provide an entry point, OS2_PM_DRV_ENABLE. This entry point will be invoked with three parameters: 1) the subfunction, 0x0C, which indicates the meaning of the other parameters, 2) a pointer to some flags which we can ignore here, and 3) a pointer to a pointer to the dispatch table. When this function is called, MONITOR.DLL saves a copy of the original dispatch table, and modifies the dispatch table so that functions residing within MONITOR.DLL will be invoked rather than the original table entry. When the modified dispatch table is used to invoke graphics primitives, MONITOR.DLL will receive control. When any operation performed by MONITOR.DLL is complete, it then invokes the original graphic primitive by invoking the function through the address saved in the copy of the original dispatch table. This is easily accomplished since one of the parameters of every graphics primitive function contains its position in the dispatch table.

Once a primitive has been hooked, it receives control any time the primitive is invoked by the Graphics Engine. In general, MONITOR.DLL performs the following steps:

1) Process only if monitoring has been started (monStart).

2) Validate the parameters to verify that pointers can successfully be dereferenced without a general protection fault occurring.

3) Process only if the operation is being performed on a screen device context rather than to memory or to a printer.

4) Calculate a candidate rectangle from the provided parameters. A candidate rectangle is a temporary rectangle to be considered for later inclusion in the Accumulated Changed Rectangle.

5) Convert from World to Screen Coordinate Space if necessary.

6) Clip the candidate rectangle to the clipping region—essentially the visible portion of the window being updated.

7) Accumulate the candidate rectangle into the Changed Region.

As an example of the above steps, we now consider GreBitBlt, which receives nine parameters.

1) A boolean variable is maintained within MONITOR.DLL which indicates whether monitoring has been started. Examine it to determine if more processing should be done.

2) Parameter three, cPoints, indicates the number of points contained in parameter four, paptlPoint. First verify that the proper number of points are present (at least 2). Second, verify that the memory pointed at by paptlPoint can be accessed.

3) Use the GreQueryDeviceCaps Graphics Engine function with parameter one, hdc, and CAPS_FAMILY index. Examine the returned value, cOutData, to determine if the operation is to be performed on a screen device.

4) For GreBitBit, paptiPoint will address the lower left and upper right points of the target rectangle. No further calculation is required to obtain the candidate rectangle for this primitive.

5) In OS/2, it is possible that different coordinate spaces are used. For the GreBitblt primitive, parameter six includes a flag, BBO_TARGWORLD, which indicates if the coordinate rectangle must be transformed into Device Coordinates. The Graphics Engine provides a function to do just that, GreConvert. The resulting rectangle will be the correct length and width, but may be relative to a window origin rather than relative to the screen origin. Use GreGetDCOrigin and shift the rectangle if the Device Context origin is not equal to the screen origin.

6) The Clipping Region, maintained by the Graphics Engine, indicates where the Graphics Engine permits drawing. It generally excludes portions of an application window which are not visible because they are covered by other windows. The MONITOR.DLL queries the bounding rectangle of the Clipping Region via GreGetClipBox and converts to Screen Coordinates with GreGetDCOrigin. It then calculates the intersection of the candidate rectangle and the Clip Box. The resulting rectangle describes the area of the screen which will be impacted by the GreBitblt operation.

7) Each candidate rectangle is merged into an Accumulated Changed Rectangle. The Accumulated Changed Rectangle is the area which bounds all of the candidate rectangles processed since the last Reset.

In the example above, GreBitBlt, the Graphics Engine provides a candidate rectangle directly as indicated in step four above. Other primitives supply different parameters, but the update area can be readily calculated with simple arithmetic operations. For example, GreDisjointLines provides an array of points and the number of points in the array. To calculate the update area, one can simply iterate through the array, finding the minimum values for xLeft (x1 in the figures) and yBottom (y1 in the figures), and the maximum values for xRight (x2 in the figures) and yTop (y2 in the figures). The resulting points define the rectangle which will bound all of the points in the array. GreImageData draws a single horizontal line relative to the current position in the device context. The current position is maintained by the graphics engine, and can be queried with GreGetCurrentPosition. One of the parameters to the GreImageData function indicates the number of pels to be drawn, and a second parameter indicates which row relative to the current position. From this data, the condidate rectangle can be determined.

MONITOR.DLL also contains three functions provided for use by the Capture Module 120: monStart, monStop, and monQueryBounds. These three functions control the accumulation and reporting of updated screen regions.

The function monStart starts the monitoring or "evaluation" of the graphics primitives. The function monStop stops the evaluation of the graphics primitives, although the graphics primitives are still being hooked.

Of particular interest is monQueryBounds, which not only reports the updated portion of the screen (or reports that no changes have occurred), but allows the Monitor Module 122 to reset the Accumulated Changed Rectangle. With this single function call, a user application can poll MONITOR.DLL to find changed areas of the display.

Other additional considerations must also be noted. In a multitasking operating system such as OS/2, care must be taken that updates to the bounding rectangle are performed in a single, atomic operation. This can be accomplished with mutex semaphores. Any operation which acquires the semaphore should execute quickly and release the semaphore. Since any process which writes to the display does so via the hooked graphic primitives, it would be unacceptable for the semaphore to cause any thread to block for any significant period of time.

Not all of the graphics primitives relate to screen updating. However, out of the approximately 200 Graphics Primitives used in OS/2, the following Graphics Primitives have been found to cause screen updates:

GreDisjointLines
GrePolyLine
GreDrawLinesInPath
GrePolyShortLine
GrePolyScanLine
GreDrawBits
GreBitblt
GreSetPel
GreImageData
GreRestoreScreenBits
GreDrawBorder
GreCharString
GreCharStringPos
GrePolyMarker
GreCharRect
GreCharStr
GreScrollRect
GreErasePS There are other Graphic Primitives, although not actually drawing on the screen, as will be understood to those skilled in the art, which provide needed information regarding screen drawing:

GreGetCurrentPosition
GreGetClipBox
GreConvert
GreDeath
GreQueryDeviceCaps
GreResurrection GreGetDCOrigin Use of Disclosure in Windows 3.1 Environment In Windows 3.1, the connection between the graphics engine and Display Drivers is similar in architecture compared to that used in OS/2. However, since Windows 3.1 does not provide an architected method to hook graphics primitives, an alternative method must be used. Those skilled in the art should understand that the disclosure of the Windows 3.1 solution is not intended to limit the scope of the disclosure. Rather, the teachings of the present application can be applied to other Microsoft operating systems, such as, for example, Windows 3.x, Windows NT, Windows ME, Windows 95, Windows 98, Windows 2000, Windows XP, as well as variations upon these operating systems and future Windows operating systems.

Windows 3.1 stores the dispatch table in memory owned by GDI.EXE (the graphics engine). In order to modify the contents of the dispatch table so that we may hook graphics primitives, we must first search the GDI heap for the dispatch table. Windows provides a function, SystemHeapInfo, which provides a starting place for that search.

Use the Windows functions GlobalFirst and GlobalNext to walk through the global memory heap looking for memory owned by GDI. For each memory block owned by GDI, use LocalFirst and LocalNext to walk through the memory block. Each item in the local heap is a GDI object such as a device context, a font, a pen, a brush, or other GDI object. These objects can be identified by a signature at a known offset into the object. For our purposes, we search for the signature of a device context, 0x6f4d. Also at a known offset into the device context is a pointer to the dispatch table.

Since we have relied upon undocumented features of Windows 3.1 to find the dispatch table (device context signature and offset of the dispatch table), it is sensible to verify that we have indeed correctly located the dispatch table. This can be done by the following technique: compare the first entry of the dispatch table, which is the address of the Bitblt function in the display driver, to the address of the Bitblt function which we determine by use of the LoadLibrary and GetProcAddress functions. If the addresses are equal, we can safely assume that we have found the dispatch table.

Once the dispatch table has been found, a copy of the original is made and retained. Updates are then made to the original so that MONITOR.DLL gains control when graphic primitives are called. When information of interest has been extracted, control is passed to the original graphic primitive.

Hooked primitives include:
BitBlt
Output
Pixel
ExtTextOut
FastBorder
SetDIBitsToDevice
StretchBlt
StretchDIBits
BitmapBits Capture Software Operation Sequential operation of the capture process will now be described. A poll is issued from the server application over the network to a Capture Module 120 installed on an agent's workstation. The Capture Module 120 responds by sending a query to the Monitor Module 122, which has been constantly accumulating boundaries of the Changed Region. In response to the query, the Monitor Module 122 sends the coordinates of a rectangle bounding the Changed Region, or indicates that no changes have occurred. The Monitor Module then resets the Accumulated Changed Rectangle and begins accumulating new boundaries until it is queried again by the Capture Module 120.

At this point, the Capture Module has the rectangular coordinates of the Changed Region, which in the preferred embodiment is rectangular. In one embodiment, the coordinates are defined by two points at opposing corners of the rectangle. With the knowledge of the coordinates, the Capture Module utilizes the operating system to grab the actual Changed Region image displayed on the screen. Such grabbed data is compressed and sent to the server for time stamping and storage for later decompression and display, or can also be immediately sent to the supervisor's workstation for "real time" viewing. Typically, such "screen portions" are simply overwritten onto the previous screen.

Therefore it may be seen that as changes occur on the agent's desktop, the Monitor Module determines the region of the changes caused by such input, but when the poll comes in from the network to the Capture Module, capturing of the image actually occurs via the Capture Module.

As an example, as shown in FIGS. 3a-3c, assume that alphanumeric characters are typed by the agent between the polls sent to the Monitor Module 122. The disclosure allows for the determination of the size and location of the window which included these six characters, and allows the Capture Module to grab a rectangular screen portion which circumscribes the alphanumeric characters, whereupon the captured image of same is sent to the server where is it can later be "pasted" over an image corresponding to the screen image seen prior to the typing of the alphanumeric characters.

It may be noted that if the agent is sitting there doing nothing, every time the Capture Module 120 is polled from the network server, it will respond by effectively saying that, "nothing has changed" (as it has been instructed by the Monitor Module 122) and no further processing will be necessary. It may be understood that this is more efficient than having to grab and compare two identical screen displays, although total screen comparison is also contemplated as an alternate embodiment of the present disclosure.

The Server

The server consists of server hardware and software installed thereon. The hardware for the server may consist of a Pentium-based PC including voice and network cards, although other hardware may be used without departing from the spirit and scope of the present disclosure.

The server software includes an operating system such as OS/2, although other operating system software may be used without departing from the sprit and scope of the present disclosure. In reference to FIG. 7, other software installed on the server includes:
Kernal software
User System software
Data Collection System software
Voice System software
Filter System software (a.k.a. "Filter")
Schedule System software (a.k.a. "Scheduler")
Database software The Kernal software spawns which include the main controlling processes, which include the User System, Data Collection system, Voice System, Filter System, and Schedule System processes.

The User System software is responsible for accepting user connections from the supervisor software, and for spawning a process to interact with that user, so that each user gets an dedicated process per user. If data to be sent to user it is responsible for actually sending the data to the user over the network. The User System software includes the User Manager (See FIGS. 8 and 9) The User Manager provides the connection of the User System to the network, thus allowing the user to provide monitoring instructions.

The Data Collection System software is responsible for collecting Changed Region data. The Data Collection software includes a Device Manager (See FIGS. 8 and 9) and one or more "virtualized" Agent Devices, each of which corresponds to a particular agent workstation configuration (e.g. OS/2, Windows, etc.,). In the event of multiple agent monitoring, the Agent Device is responsible for tracking each separate monitoring event by allocating a thread for each monitor event.

The Voice System software controls the voice hardware or software, which is conventional in nature and allows for "live" monitoring of an agent's telephone extension at a remote (e.g. the supervisor/user's) extension, and/or allows for digital storage of the agent's telephone conversation on the server hard drive for later playback in sync with Changed Region data through use of a scriptlike journal file and a replay engine as discussed in detail below. The Voice System software and hardware is conventional, and different configurations may be used without departing from the spirit and scope of the present disclosure.

The Filter system also allows for random monitoring. The Filter System software provides filtering processes to allow remote device events to be acted upon. For example, if wire transfers are possible from an agent's workstation, it may be desired to record related on-screen and/or voice-related events for purposes of providing an audit trail.

The Schedule System software allows for users to schedule future monitoring events for later playback. For example, monitoring of a particular agent could be scheduled for later specific periods.

The Database software is conventional, and allows for the storage of information such as agent location, workstation type, stored Changed Region data information, voice data storage locations, etc.

Figure 7:
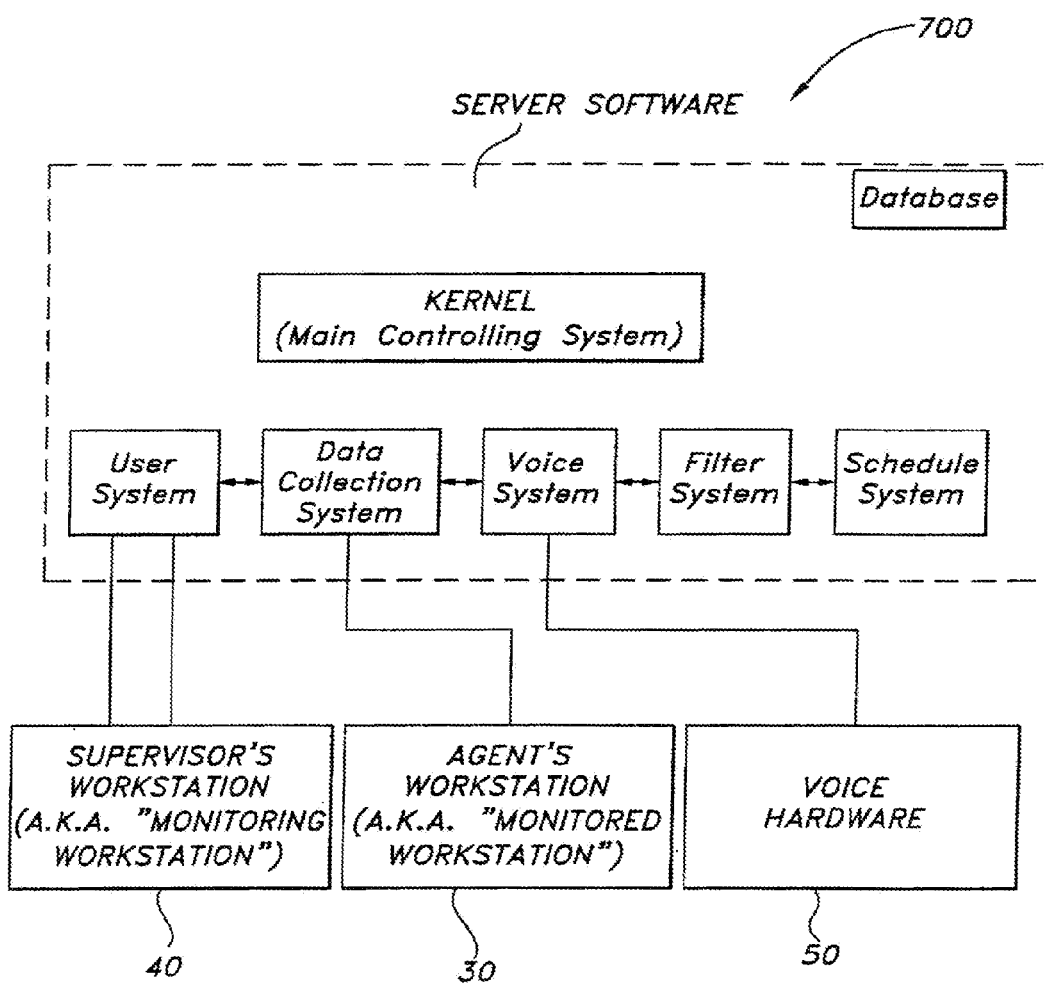
FIG. 7 is a diagram 700 illustrating the interaction of various software elements loaded on the server, and how these elements interact with other elements.

Operation of the server is described generally as follows in reference to FIG. 7. After receiving a "start monitor" command (either live from a user through a User Executable or pursuant to scheduling via the Schedule System), the Data Collection System on the server sends a poll to the Capture Module 120 on the monitored workstation 30, and waits to receive data from the Capture Module corresponding to the Changed Region. Upon receiving this data, the Data Collection System passes the data on to the User System, which either passes the data on to the Monitoring Workstation 40 (see also FIG. 1) in the case of live monitoring, and/or stores the data in memory for later playback.

Figure 8:
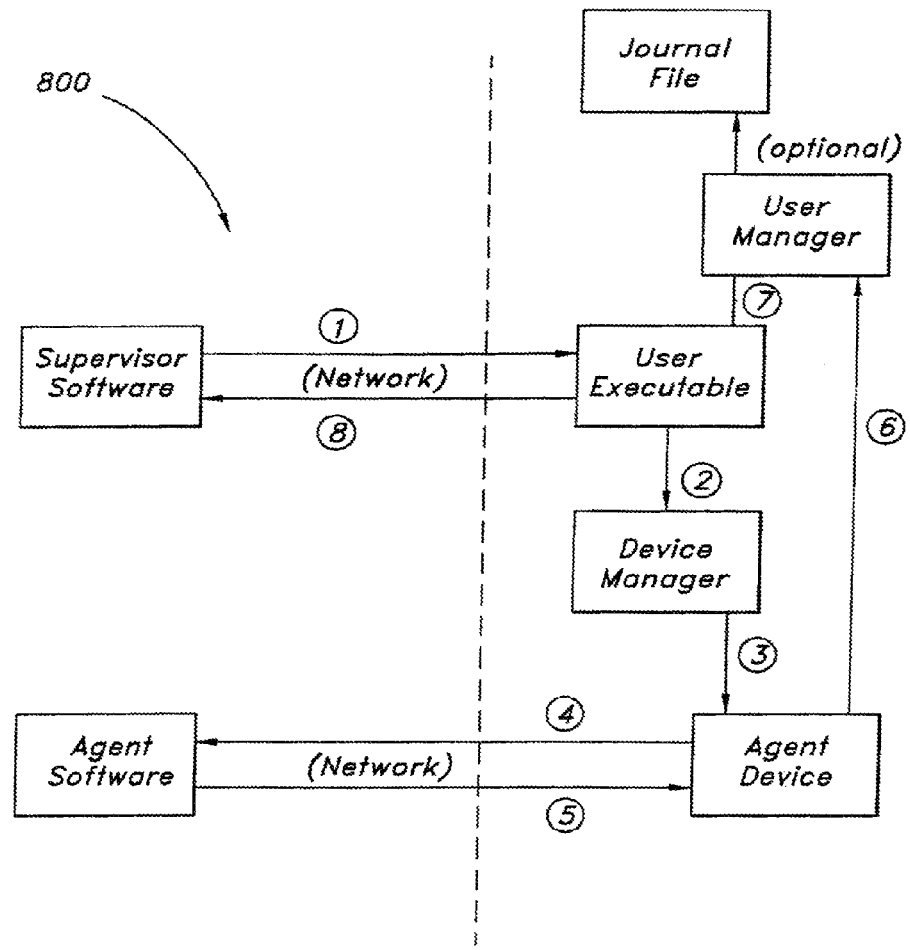
FIG. 8 is a diagram 800 illustrating the interaction of various software elements during live monitoring from a user (also known as a supervisor) and an agent.

Reference is now made to FIG. 8, to illustrate more details relating to live monitoring. In step "1", the supervisor connects through supervisor software on his/her workstation with a unique "User Executable" which has been spawned by the User Manager. In the case of multiple monitoring events, multiple User Executables are spawned and are all under the domain of the User Manager. The User Manager and the spawned User Executables comprise the User System.

Continuing in reference to FIG. 8, in step "2", the User Executable gets a "start monitor" request from the supervisor/user and forwards the request to the Device Manager, which determines at step "3" which of the available Agent Device processes (e.g. OS/2, windows, etc.) would get the request. The selected Agent Device at step "4" sends the start monitor command to the actual capture software on the agent's workstation. Data and responses would then flow back at step "5" as described above.

It should be noted that the Agent Device can provide flow control for data transmitted over the network. It knows the amount of monitored connections, as well as the number of samples "queued" by the corresponding Capture Modules, so it can dynamically reduce sample size to keep overall network traffic within a threshold. This is one important aspect of the present disclosure.

When the Agent Device gets Changed Region data back, it stores it in server RAM and sends its stored address to the User Manager at step "6". The User Manager determines which user wanted the monitor, and then sends at step "7" the Changed Region data storage location to the User Executable assigned to that user. The User Executable includes as a source file a replay engine, which plays back the Changed Region data along the network (step "8") to the user/supervisor.

In the case of live monitoring such as described above, it may be understood that the server passes on Changed Region data from the agent's Monitored Workstation to the user's Monitoring Workstation while at the same time providing live telephone monitoring of the agent by the user. This allows the user to monitor the agent's on-screen activities while at the same time listen to the agent's telephone conversation(s). It may be understood that such a monitoring "session" could extend over one or more different telephone calls made/received by the agent.

Figure 9:
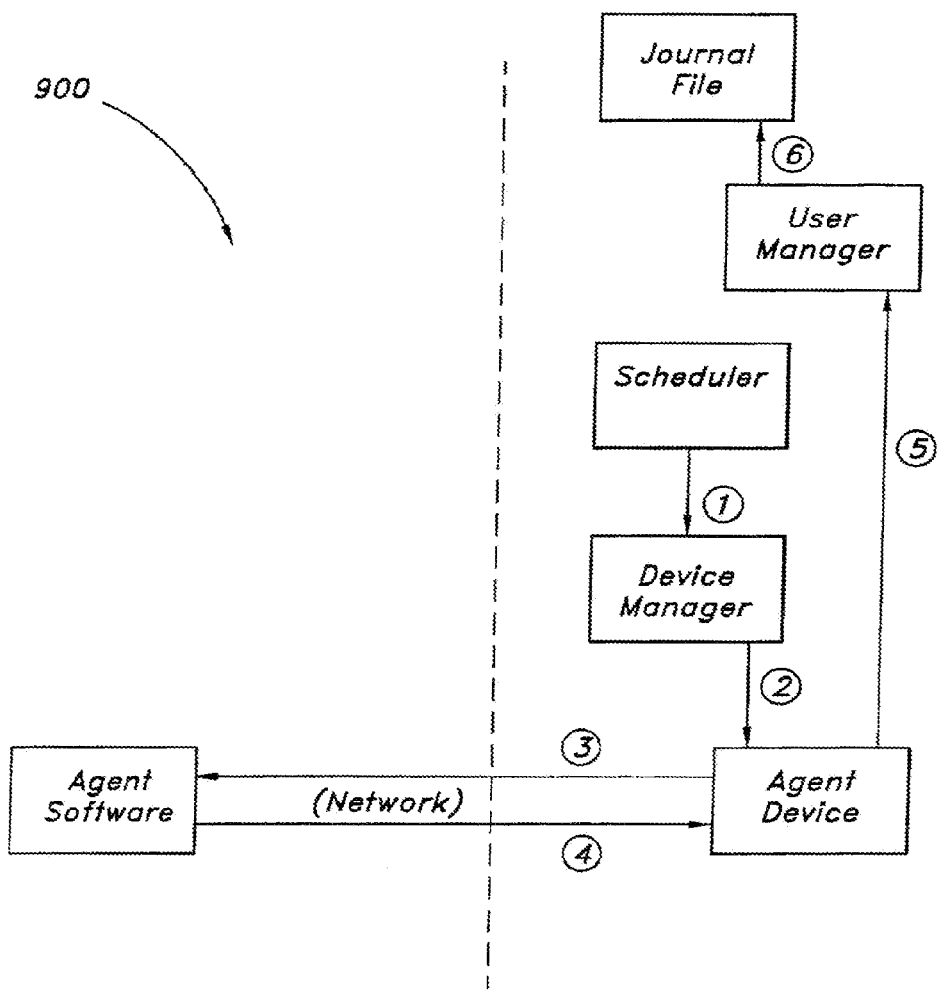
FIG. 9 is a diagram 900 illustrating the interaction of various software elements during scheduled monitoring of an agent.

Reference is now made to FIG. 9, to illustrate the case of scheduled monitoring. In this instance, the Scheduler (being part of the Schedule System) issues a "start monitor" command to the Device Manager, and steps 2-5 of FIG. 9 follow in a manner preferably identical to steps 3-6 immediately above in connection with FIG. 8. However, as shown by step 6 in FIG. 9, typically the User Manager then sends the Changed Region data information to a Journal File where it is time stamped for later replay in sync with the recorded voice data by the Replay Engine. It should be noted that a Journal File could also be created in the "live monitoring" example of FIG. 8; in such an instance live and later monitoring is possible.

Figure 5:
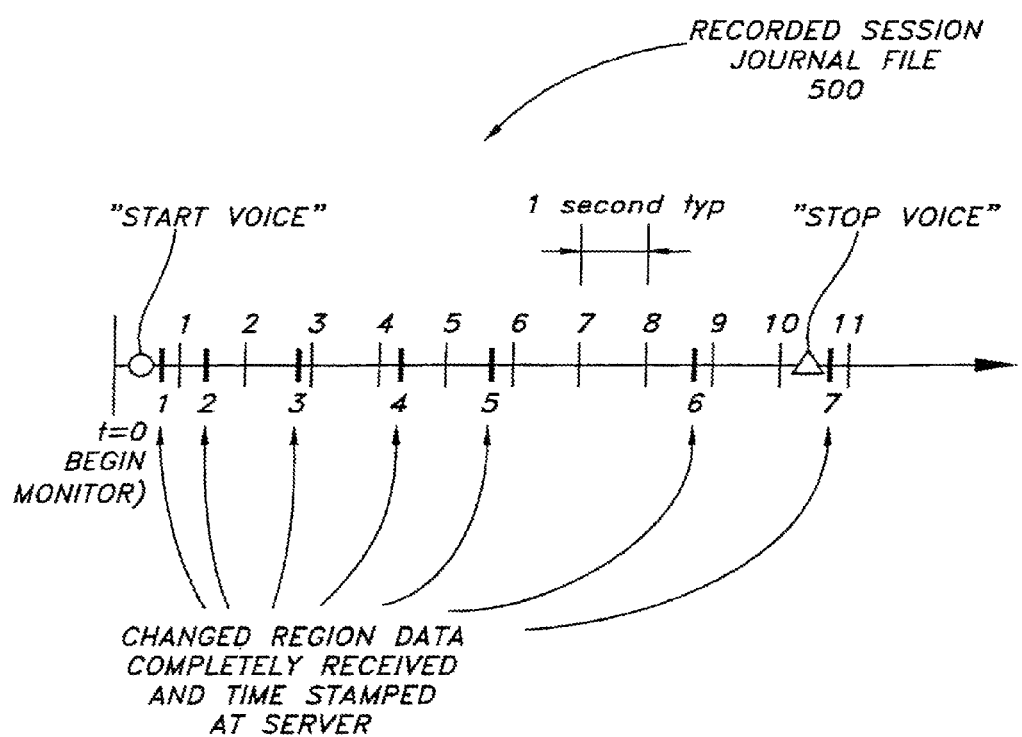
FIG. 5 illustrates the composition of a Journal File 500, which allows for synchronized voice and screen data playback.
Figure 6:
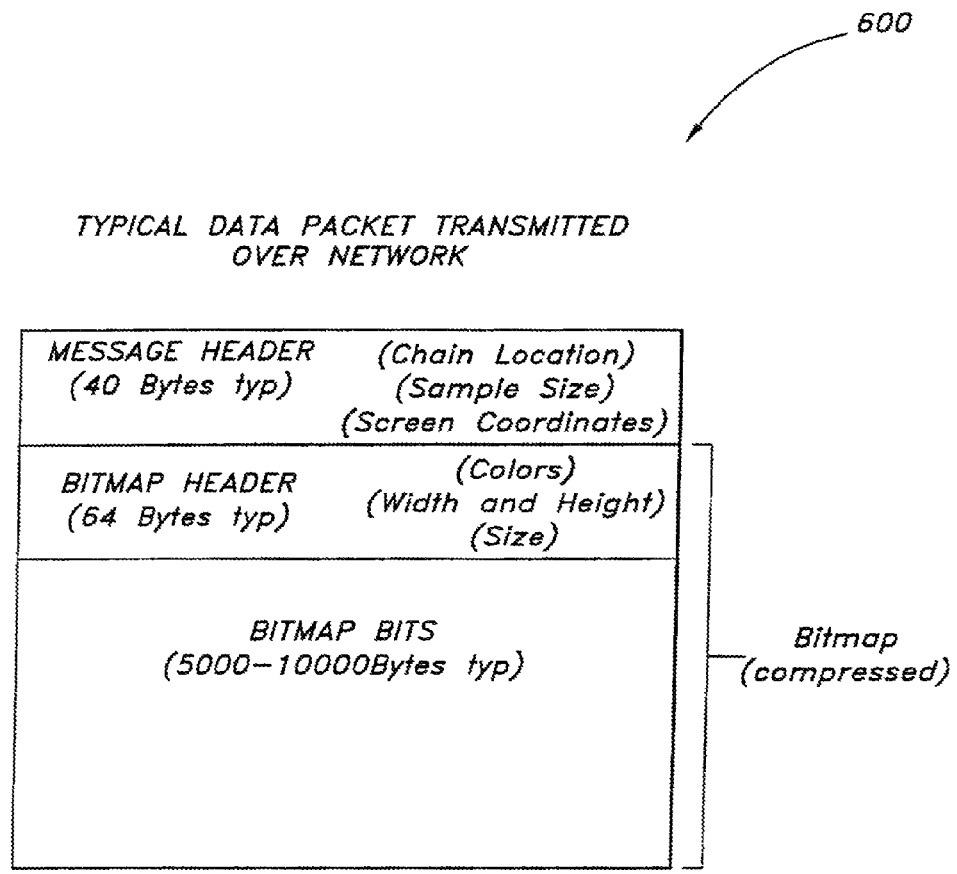
FIG. 6 is an illustration of a data packet 600 such as transferred over the network under the present disclosure.

The journal file is created by the process which issues the start monitor command, if the record mode is selected. In the case of live monitoring, the journal file will be created by a User Executable. In the case of scheduled monitoring, the journal file will be created by a Schedule System. After creation of the journal file, Changed Region data is written to the journal file as it is received by the User Manager. A typical journal file configuration is shown in FIG. 5. The header of the journal file has the entire journal file database record for safety purposes in case the Database ever gets corrupted. The journal file is in essence a script which is played back later by the Replay Engine.

When the Agent Device confirms contact with the Capture Module of the monitored workstation, it spawns a thread, which begins to poll the Capture Module. At the same time, another separate thread will be sent from the server to the Voice System software, giving it an agent extension number of "login" number, and commanding it to begin recording on a particular channel until told to stop. The login number is utilized to instruct the phone switch hardware to route the voice audio into the connected voice channel, whereupon it can be monitored live or digitally stored.

The two above threads to the Capture Module and the Voice System software are initiated synchronously—they can happen in any order. However, the Voice System software will typically begin recording first because its instructions do not have to go over the network. This is demonstrated in FIG. 5 (showing the journal file 500 makeup), in which the small circle on the time line illustrates a time stamped "begin voice playback" event, written to the journal file before any Changed Region data event is written to the journal file. Similarly, the small triangle on the time line illustrates a time stamped "stop voice playback" event, which is also typically written the journal file before the last Changed Region data event is written to the journal file. Such time stamping of recorded voice events allows for later playback of the Changed Region data in time sync with the recorded voice data, through the use of conventional voice recording and playback techniques.

The Monitoring Workstation

As noted above, the supervisor's workstation is hooked up to the network through a TCP/IP connection.

The supervisor's workstation includes hardware suitable for running an operating system such as OS/2, and software loaded thereon.

The supervisors software includes "front-end" software, which allows someone at the supervisor's workstation to modify the Database Module on the server allowing for definitions as to where a particular agent sits, etc. The supervisor's software also includes software to allow the user to send commands to the user's corresponding User Executable, thus allowing the user to drive the User Executable's Replay Engine for replay of the journal file, to perform live monitoring, or to perform housekeeping duties such as the deletion of old journal files.

Voice Hardware

Voice hardware 50 is typically in the form of a voice card mounted within the server, and is typically wired into the telephone system used to provide telephone extensions to the supervisor and the agent. This configuration can vary depending on whether TI, analog, or digital phone configurations are used. It should also be recognized that software components could be used in place of hardware.

Alternative Screen Capture Technique

It may be noted that a somewhat separate but related disclosure is contemplated by applicant, that being the use of "total screen comparison" of two sequential desktop images. Such images are grabbed from the desktop by a Monitor Module (no Capture Module needed) compared for differences, and a Changed Region is defined which includes the screen difference. Such a Changed Region can be sent for viewing at a remote location such as described above. It may be understood that in this alternate configuration, graphics primitives are not "hooked" or evaluated.

It should also be noted that some video enhancement technologies, such as DirectX and Java Swing bypass the video driver, thus alternative methods are used for screen change detection. The introduction of thin-client support for these video enhancement technologies involves slight changes to the model described above. In addition to the absence of a video driver, noted above, thin-client sessions use network sockets that are global entities. Thus, multiple applications cannot open the same socket port at the same time.

To solve the socket problem on thin-client servers, a CaptureService module was created that acts as a middleman, thereby accepting multiple incoming requests and disbursing them to the appropriate session. In various embodiments of the disclosure, the CaptureService module can also monitor the health of the capture software and restart the process if there is a problem.

To account for the absence of the video driver, the capture software interfaces with the Windows GDI on remote agent workstations or thin-client sessions. A change detection module thereby monitors the screen display for changes. Detected changes can be captured, compressed and stored for delivery to a requestor using the change detection module. Upon request, capture software delivers the changed data via socket connection to the requestor (e.g., the monitor server).

Miscellaneous

The Capture Module 120 and Monitor Module 122 software programs can be written in languages such as C, C++, and assembly, although other software languages could be used without departing from the spirit and scope of the present disclosure.

Moreover, the disclosure of the present invention is not merely intended to cover only the operating systems disclosed, but myriad other operating systems suitable for call center solutions. It should be understood that the principals of the present disclosure can be applied to each of these alternative operating systems. For example, some suitable operating systems could include Unix-based systems, such as, for example, Solaris from Sun Microsystems, among others, Linux, such as available from RedHat, and Mac O/S (X) available from Apple Computer, among many others.

While this disclosure has been described in specific detail with reference to the disclosed embodiments, it will be understood that many variations and modifications may be effected within the spirit and scope of the disclosure as described in the appended claims.

What is claimed is:

1. A method of training an agent associated with a monitored workstation having a display screen and a telephone extension, said method comprising:
    a) recording graphical information entered by an agent during a communication session, the graphical information corresponding to two actual sequential screen changes occurring at said monitored workstation and storing said screen change related graphical information;
    b) recording data corresponding to audio telephone conversation in the communication session occurring at said monitored workstation during said two actual sequential screen changes and storing said audio telephone conversion-related data;
    c) subsequent to steps a) and b), playing back, with the use of said screen change-related graphical information and said audio telephone conversation-related data, said audio telephone conversation in substantial synchronization with said sequential screen changes as they both happened in real time at said monitored workstation, to allow one at a monitoring workstation to simultaneously view and hear on-screen and telephone activities substantially as they occurred at said monitored workstation; and
    d) providing training to an agent associated with said monitored workstation based upon the played back audio telephone conversation and sequential screen changes.

2. The method of claim 1, wherein the step of providing training comprises providing training which is not disruptive of the agent's work activities.

3. The method of claim 1, further comprising the step of determining efficiency of the agent's work activities based upon the played back audio telephone conversation and sequential screen changes.

4. The method of claim 1, further comprising the step of providing feedback to the agent based upon the played back audio telephone conversation and sequential screen changes.

5. A method of supervising an agent associated with a monitored workstation having a display screen and a telephone extension, said method comprising:
    a) recording graphical information entered by an agent during a communication session, the graphical information corresponding to two actual sequential screen changes occurring at said monitored workstation and storing said screen change related graphical information;

b) recording data corresponding to audio telephone conversation during the communication session occurring at said monitored workstation during said two actual sequential screen changes and storing said audio telephone conversation-related data;

c) subsequent to steps a) and b), playing back, with the use of said screen change-related graphical information and said audio telephone conversation-related data, said audio telephone conversation in substantial synchronization with said sequential screen changes as they both happened in real time at said monitored workstation, to allow one at a monitoring workstation to simultaneously view and hear on-screen and telephone activities substantially as they occurred at said monitored workstation; and d) providing feedback to an agent associated with said monitored workstation based upon the played back audio telephone conversation and sequential screen changes.

6. The method of claim 5, further comprising the step of providing training to the agent associated with said monitored workstation.

7. The method of claim 5, further comprising the step of determining efficiency of the agent's work activities based upon the played back audio telephone conversation and sequential screen changes.

8. An apparatus for supervising an agent associated with a monitored workstation having a display screen and a telephone extension, said apparatus comprising:

means for recording graphical information entered by an agent during a communication session, the graphical information corresponding to two actual sequential screen changes occurring at said monitored workstation and storing said screen change related graphical information;

means for recording data corresponding to audio telephone conversation occurring at said monitored workstation during said two actual sequential screen changes and storing said audio telephone conversation-related data;

means for playing back, subsequent to recording of the sequential screen changes and the audio telephone conversation, with the use of said screen change-related graphical information and said audio telephone conversation-related data, said audio telephone conversation in substantial synchronization with said sequential screen changes as they both happened in real time at said monitored workstation, to allow one at a monitoring workstation to simultaneously view and hear on-screen and telephone activities substantially as they occurred at said monitored workstation; and means for providing feedback to an agent associated with said monitored workstation based upon the played back audio telephone conversation and sequential screen changes.

9. The apparatus of claim 8, further comprising means for providing training to the agent.

10. The apparatus of claim 8, further comprising means for determining efficiency of the agent's work activities based upon the played back audio telephone conversation and sequential screen changes.

11. A method of supervising an agent associated with a monitored workstation having a display screen and telephone extension, said method comprising:

a) recording graphical information entered by an agent during a communication session, the graphical information corresponding to two actual sequential screen changes occurring at said monitored workstation and storing said screen change related graphical information;

b) recording data corresponding to audio telephone conversation occurring at said monitored workstation during said two actual sequential screen changes and storing said audio telephone conversation-related data;

c) subsequent to steps a) and b), playing back, with the use of said screen change-related graphical information and said audio telephone conversation-related data, said audio telephone conversation in substantial synchronization with said sequential screen changes as they both happened in real time at said monitored workstation, to allow one at a monitoring workstation to simultaneously view and hear on-screen and telephone activities substantially as they occurred at said monitored workstation; and d) providing supervision of an agent associated with said monitored workstation based upon the played back audio telephone conversation and sequential screen changes.

* * * * *